United States Patent
Naitou

(10) Patent No.: US 12,011,825 B2
(45) Date of Patent: Jun. 18, 2024

(54) DEVICE, METHOD AND PROGRAM FOR ESTIMATING WEIGHT AND POSITION OF GRAVITY CENTER OF LOAD BY USING ROBOT

(71) Applicant: Fanuc Corporation, Yamanashi (JP)

(72) Inventor: Yasuhiro Naitou, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 17/834,067

(22) Filed: Jun. 7, 2022

(65) Prior Publication Data

US 2022/0297321 A1 Sep. 22, 2022

Related U.S. Application Data

(62) Division of application No. 16/389,128, filed on Apr. 19, 2019, now Pat. No. 11,602,863.

(30) Foreign Application Priority Data

Apr. 24, 2018 (JP) .................................. 2018-082929

(51) Int. Cl.
*B25J 19/02* (2006.01)
*G01G 23/00* (2006.01)
*G01M 1/12* (2006.01)

(52) U.S. Cl.
CPC ............... *B25J 19/02* (2013.01); *G01G 23/00* (2013.01); *G01M 1/122* (2013.01)

(58) Field of Classification Search
CPC ......... B25J 19/02; G01G 19/52; G01G 23/00; G01M 1/122
See application file for complete search history.

(56) References Cited

U.S. PATENT DOCUMENTS 6,343,243 B1 1/2002 Brogårdh et al.
8,831,779 B2 9/2014 Ortmaier et al.
(Continued)

FOREIGN PATENT DOCUMENTS

CN 103495977 A 1/2014
CN 105643639 A 6/2016
(Continued)

OTHER PUBLICATIONS

USPTO Non Final Office Action issued in U.S. Appl. No. 16/389,128, dated Jul. 29, 2022, 18 pages.
(Continued)

*Primary Examiner* — Natalie Huls
(74) *Attorney, Agent, or Firm* — Buchanan Ingersoll & Rooney PC

(57) ABSTRACT

A device, a method and a program, by which a weight and/or a position of a gravity center of a load attached to a movable part of a robot can be estimated by a simple configuration. The device has a torque sensor configured to detect a torque applied to an axis for driving the movable part of the robot, and a calculation section configured to calculate the weight of the article, by using: a first torque applied to the axis, when the article attached to the movable part is positioned at a first position and represents a first posture; a second torque applied to the axis, when the article attached to the movable part is positioned at a second position different from the first position and represents the first posture; the first position; and the second position.

5 Claims, 2 Drawing Sheets

(56) References Cited

U.S. PATENT DOCUMENTS

| | | | |
|---|---|---|---|
| 10,800,035 B2 | 10/2020 | Takamura | |
| 11,027,435 B2* | 6/2021 | Moosman | B25J 13/089 |
| 2013/0173060 A1* | 7/2013 | Yoo | B25J 9/0006 |
| | | | 700/261 |
| 2015/0328771 A1* | 11/2015 | Yuelai | B25J 13/085 |
| | | | 414/730 |
| 2016/0305842 A1* | 10/2016 | Vulcano | G01M 1/122 |
| 2018/0169584 A1 | 6/2018 | Visser et al. | |
| 2018/0169854 A1* | 6/2018 | Shiratsuchi | B25J 11/0095 |
| 2018/0272531 A1* | 9/2018 | Takamura | B25J 9/1638 |
| 2019/0275674 A1* | 9/2019 | Yamamoto | B25J 9/1638 |
| 2021/0114211 A1* | 4/2021 | Knott | B25J 9/1638 |
| 2021/0260759 A1* | 8/2021 | Knudsen | G05B 19/4155 |
| 2022/0088804 A1* | 3/2022 | Spenninger | B25J 19/02 |

FOREIGN PATENT DOCUMENTS

| | | |
|---|---|---|
| CN | 106346477 A | 1/2017 |
| DE | 102008001664 B4 | 7/2015 |
| JP | H02300544 A | 12/1990 |
| JP | H03142179 A | 6/1991 |
| JP | 07205075 A | 8/1995 |
| JP | H09091004 A | 4/1997 |
| JP | 2004025387 A | 1/2004 |
| JP | 2010076074 A | 4/2010 |
| JP | 2011235374 A | 11/2011 |
| JP | 2017056525 A | 3/2017 |
| KR | 101209779 B1 | 12/2012 |
| WO | 2017103682 A2 | 6/2017 |

OTHER PUBLICATIONS

Entire patent prosecution history of U.S. Appl. No. 16/389,127, filed Apr. 19, 2019, entitled "Device, Method and Program for Estimating Weight and Position of Gravity Center of Load by Using Robot."

An et al., "Estimation of inertial parameters of rigid body links of manipulators", 24th IEEE Conference on Decision and Control, Ft. Lauderdale, FL, (Dec. 1985), pp. 990-995.

Atkeson et al., "Rigid body load identification for manipulators", 24th IEEE Conference on Decision and Control, Ft. Lauderdale, FL, (Dec. 1985), pp. 996-1002.

Chen et al., "Identifying method of load for sensorless industrial robot", Abstract (month unknown 2015), 41.1595-1599.10.13700/j.bh.1001-5965.2014.0669, 1 page.

* cited by examiner

DEVICE, METHOD AND PROGRAM FOR ESTIMATING WEIGHT AND POSITION OF GRAVITY CENTER OF LOAD BY USING ROBOT

CROSS REFERENCE TO RELATED APPLICATIONS

This application is a Divisional Application of U.S. patent application Ser. No. 16/389,128, filed Apr. 19, 2019, which claims benefit of priority to Japanese Patent Application No. 2018-082929, filed Apr. 24, 2018. The contents of these applications are incorporated herein by reference.

BACKGROUND OF THE INVENTION

1. Field of the Invention

The present invention relates to a device, a method and a program for estimating a weight and a position of a gravity center of a load, by using a robot.

2. Description of the Related Art

Generally, an article (or load) is attached to a front end of a movable part (e.g., a robot arm) of a robot, and it is important to know or acquire a weight and a position of a gravity center of the load, in order to control the robot with high accuracy.

As a relevant prior art, a device or method for estimating the weight or the position of the gravity center of an article attached to a robot arm is well known, wherein the torque of a rotation axis of the robot arm to which the article is attached is used (e.g., see JP H03-142179 A, JP H09-091004 A and JP H02-300644 A).

In the conventional method for estimating the weight and the position of the gravity center of the article (e.g., a tool) positioned at the front end of the robot, a motor current for rotating an axis of the robot is measured, and then the weight of the load is calculated by using a motion equation. However, when the motor current is used, it is necessary to identify a frictional force applied to the axis, whereas it is usually difficult to identify the frictional force, and the identification of the frictional force is susceptible to error.

Otherwise, it may be possible that, before the article such as the tool is attached to the robot, the weight and/or the position of the gravity center of the article such as the tool is previously measured by a conventional means, and then a result of the measurement is manually input or set to a robot controller, etc., by an operator. However, the means for measurement may not be easily obtained (in particular, it is difficult to measure the position of the center gravity), and further, information regarding the weight and the position of the gravity center of the tool may be necessary after the tool is attached to the robot. Therefore, a method and a device are desired, in which the weight and/or the position of the gravity center can be estimated while the article is attached to the robot.

SUMMARY OF THE INVENTION

One aspect of the present disclosure is a device for estimating a weight of an article, comprising: a torque sensor configured to detect a torque applied to an axis for driving a movable part of a robot; and a calculation section configured to calculate the weight of the article, by using: a first torque applied to the axis detected by the torque sensor, when the article attached to the movable part is positioned at a first position and represents a first posture; a second torque applied to the axis detected by the torque sensor, when the article attached to the movable part is positioned at a second position different from the first position and represents the first posture; the first position; and the second position.

Another aspect of the present disclosure is a device for estimating a position of a gravity center of an article, comprising: a torque sensor configured to detect a torque applied to an axis for driving a movable part of a robot; and a calculation section configured to calculate the position of the gravity center of the article, by using: a first torque, a second torque and a third torque applied to the axis detected by the torque sensor, when the article attached to the movable part represents first, second and third postures different from each other, respectively; a first position and a first posture of the movable part when the first torque is detected; a second position and a second posture of the movable part when the second torque is detected; and a third position and a third posture of the movable part when the third torque is detected.

Still another aspect of the present disclosure is a method for estimating a weight of an article, comprising: attaching the article to a movable part of a robot having a torque sensor; detecting a first torque applied to an axis for driving the movable part by the torque sensor, when the article is positioned at a first position and represents a first posture; detecting a second torque applied to the axis by the torque sensor, when the article is positioned at a second position different from the first position and represents the first posture; and calculating the weight of the article by using the first torque, the second torque, the first position and the second position.

A further aspect of the present disclosure is a method for estimating a position of a gravity center of an article, comprising: attaching the article having a known weight to a movable part of a robot having a torque sensor; detecting a first torque, a second torque and a third torque applied to an axis for driving the movable part by the torque sensor, when the article represents first, second and third postures different from each other, respectively; and calculating the position of the gravity center of the article, by using: the first torque; the second torque; the third torque; a first position and a first posture of the movable part when the first torque is detected; a second position and a second posture of the movable part when the second torque is detected; and a third position and a third posture of the movable part when the third torque is detected.

BRIEF DESCRIPTION OF THE DRAWINGS

The above and other objects, features and advantages of the present invention will be made more apparent by the following description of the preferred embodiments thereof with reference to the accompanying drawings wherein.

DETAILED DESCRIPTION

Figure 1:
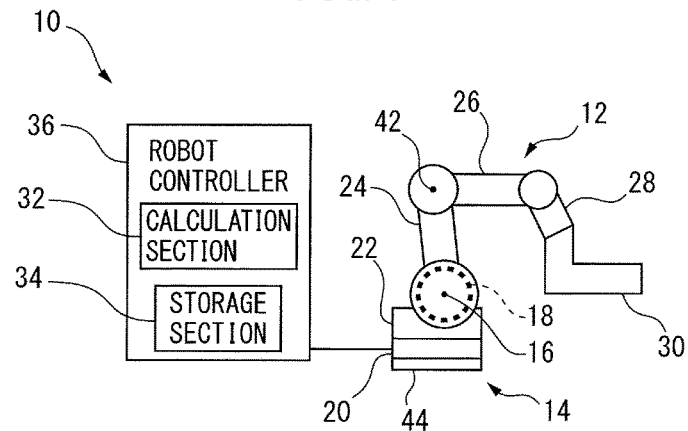
FIG. 1 shows an example of a schematic configuration of an estimation device according to a preferred embodiment.

FIG. 1 shows an example of a schematic configuration of a robot system 10 including an estimation device according to a preferred embodiment. The estimation device has a torque sensor 18 configured to detect a torque applied to an axis 16 for driving a movable part 12 of a robot 14. Robot 14 may have any structure as long as movable part 12 can perform a motion as explained below. In the drawing, robot 14 is a multi-joint robot having six axes, including: a base part 20 located at a predetermined position; a rotating body 22 rotatably attached to base part 20 about a generally vertical axis; an upper arm 24 rotatably attached to rotating body 22; a forearm 26 rotatably attached to upper arm 24; and a wrist part 28 rotatably attached to forearm 26.

The estimation device has, when used to estimate a weight of an article, a calculation section 32 configured to calculate the weight of article 30, by using: a first torque applied to axis 16 detected by torque sensor 18, when article 30 attached to movable part 12 (in this case, wrist part 28 corresponding to a front of the movable part) is positioned at a first position and represents a first posture; a second torque applied to axis 16 detected by torque sensor 18, when article 30 attached to movable part 12 is positioned at a second position different from the first position and represents the first posture; the first position; and the second position. In addition, the estimation device may have a storage section 34 such as a memory, configured to store data used by calculation section 32 and/or a result of calculation of calculation section 32.

On the other hand, when the estimation device is used to estimate a position of a gravity center of the article, calculation section 32 of the estimation device has a function for calculating the position of the gravity center of article 30, by using: a first torque, a second torque and a third torque applied to axis 16 detected by torque sensor 18, when article 30 attached to movable part 12 (in this case, wrist part 28 corresponding to the front of the movable part) represents first, second and third postures different from each other, respectively; a first position and a first posture of movable part 12 when the first torque is detected; a second position and a second posture of movable part 12 when the second torque is detected; and a third position and a third posture of movable part 12 when the third torque is detected.

As a concrete example of article 30, the weight or the position of the gravity center of which should be estimated, an end effector capable of being attached to the front end of movable part 12 (in this case, wrist part 28), such as a robot hand, a tool, a welding torch or a laser head, may be used. Herein, article 30 may also be referred to as a load. Therefore, after the weight and/or the position of the gravity center of the load is estimated by a process as explained below, robot 14 can perform a predetermined operation (such as gripping or machining a workpiece) with high accuracy, by using an estimated value, without detaching the load from robot 14. In this regard, a component held by the robot hand or an object to be machined (or the workpiece) may be included in article 30 (the load), as long as the weight or the position of the gravity center is to be estimated.

Calculation section 32 has at least one of a function for calculating the weight of article 30 and a function for calculating the position of the gravity center of article 30. In the drawing, calculation section 32 may be incorporated, as an arithmetic processing unit such as a processor, in a robot controller 36 configured to control the motion of robot 14. Alternatively, a calculator (not shown) such as a personal computer (PC), separated from robot controller 36, may have the function of calculation section 32. In this case, it is preferable that robot controller 36 and the calculator be communicably connected to each other by wire or by radio. In addition, robot controller 36 may have a suitable input section (not shown) such as a keyboard or a touch panel, so that the operator can configure various settings.

The components such as calculation section 32 of robot controller 36 may be realized as software for operating a processor such as a CPU (central processing unit) of a computer. Alternatively, the components may be realized as hardware such as a processor and/or a memory configured to at least partially execute the process of the software.

First Embodiment

Figure 2:
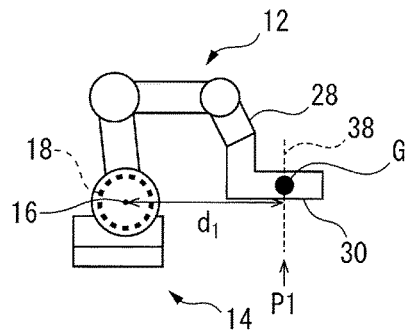
FIG. 2 exemplifies a state in which an article is positioned at a first position and represents a first posture, when the weight of the article is to be estimated.

Next, a method (procedure) for estimating the weight of the article by using the estimation device will be explained as a first embodiment. First, as shown in FIG. 2, when article 30 attached to wrist part 28 is positioned at a first position P1 and represents a first posture, a torque (first torque T1) applied to axis 16 is detected by torque sensor 18. At this time, with respect to first torque T1 and a weight W of article 30, following equation (1) is true. In equation (1), M1 is a torque applied to axis 16 in the state of FIG. 2 (i.e., at the position and the posture of movable part 12 when first torque T1 is detected) when article 30 is not attached to robot 14, and d1 is a horizontal distance between axis 16 and a vertical line 38 which passes through a position of gravity center G in the state of FIG. 2.

$$T1 = M1 + W \times d1 \tag{1}$$

Figure 3:
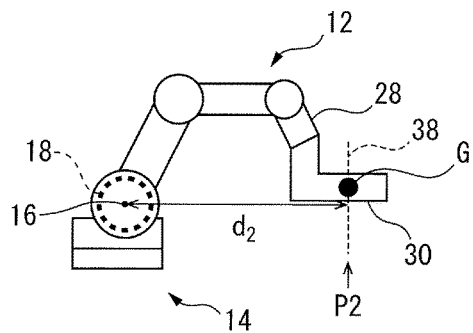
FIG. 3 exemplifies a state in which the article is positioned at a second position and represents the first posture, when the weight of the article is to be estimated.

Next, as shown in FIG. 3, robot 14 is operated so as to move article 30 to a second position different from the first position, while article 30 represents the same posture (i.e., the first posture) as at the first position. Then, a torque (second torque T2) applied to axis 16 is detected by torque sensor 18. At this time, with respect to second torque T2 and a weight W of article 30, following equation (2) is true. In equation (2), M2 is a torque applied to axis 16 in the state of FIG. 3 (i.e., at the position and the posture of movable part 12 when second torque T2 is detected) when article 30 is not attached to robot 14, and d2 is a horizontal distance between axis 16 and vertical line 38 which passes through position of gravity center G in the state of FIG. 3.

$$T2 = M2 + W \times d2 \tag{2}$$

From equations (1) and (2), following equation (3) is obtained.

$$T2 - T1 = M2 - M1 + W \times (d2 - d1) \tag{3}$$

In this regard, the posture of article 30 at the first position is the same as at the second position. Therefore, a horizontal movement distance D of a representative point such as a tool center point (in this case, wrist part 28 corresponding to the front end) of the movable part coincides with a horizontal movement distance (d2−d1) of position of gravity center G of the article. Horizontal movement distance D of wrist part 28 can be easily obtained by a movement command transmitted from robot controller 36 to robot 14 or a value of an encoder provided to each axis of robot 14, and following equation (4) is obtained by deforming equation (3).

$$W = ((T2 - M2) - (T1 - M1))/D \tag{4}$$

M1 and M2 may be obtained as the torque applied to axis 16 by using torque sensor 18, when article 30 is not attached to robot 14, after of before the first torque and the second torque. Alternatively, M1 and M2 may be obtained by calculation of calculation section 32, etc., by using the mass and the position of gravity center of each component of robot 14, etc. As an example of the calculation, a Newton-Euler method may be used.

As explained above, all terms of the right side in equation (4) are previously known, and thus weight W of article 30 can be calculated by equation (4). Although it is assumed that (d1<d2) in this embodiment, it may be possible that (d1>d2). Therefore, it is preferable that following equation (5) be used instead of equation (4).

$$W=|(T2-M2)-(T1-M1)|/D \quad (5)$$

Apparent from equation (5), in order to estimate weight W of article 30, it is sufficient to obtain T1, T2, M1, M2 and D, while d1 and d2 are not necessary. Therefore, even when position of gravity center G of the article is unknown, weight W of the article can be precisely estimated, by controlling robot 14 so as to perform the motion as described above. Although there is not a particular limitation on the first position and the second position, horizontal distance D therebetween (d2−d1) is not equal to zero.

In the first embodiment, the first torque and the second torque may be detected while robot 14 is remained at the first position and the second position, respectively. Alternatively, during movable part 12 of robot 14 is moving at a constant velocity (i.e., an acceleration of movable part 12 is zero), torque values may be detected at two arbitrary timings (in which the posture of article 30 is constant) as the first torque and the second torque. In either case, above equations (1) to (5) are true.

Second Embodiment

Figure 4:
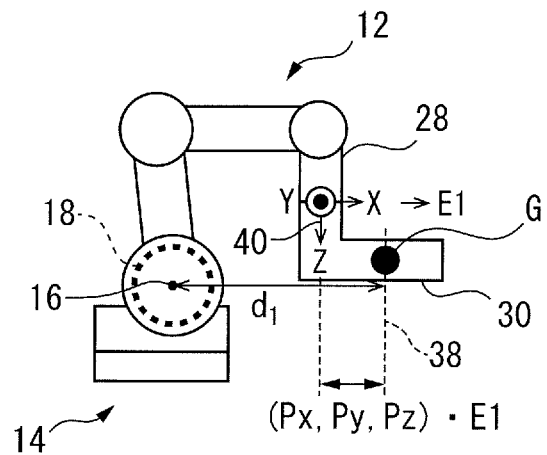
FIG. 4 exemplifies a state in which the article represents a first posture, when the position of the gravity center of the article is to be estimated.

Next, a method (procedure) for estimating the position of the gravity center of the article by using the estimation device will be explained as a second embodiment. First, as shown in FIG. 4, when article 30 attached to wrist part 28 is positioned at a first position and represents a first posture, a torque (first torque T1) applied to axis 16 is detected (measured) by torque sensor 18. At this time, with respect to first torque T1 and weight W of article 30, following equation (6) is true. In equation (6), M1 is a torque applied to axis 16 in the state of FIG. 4 (i.e., at the position and the posture of movable part 12 when first torque T1 is detected) when article 30 is not attached to robot 14, and d1 is a horizontal distance between axis 16 and vertical line 38 which passes through position of gravity center G in the state of FIG. 4.

$$T1=M1+W\times d1 \quad (6)$$

Figure 5:
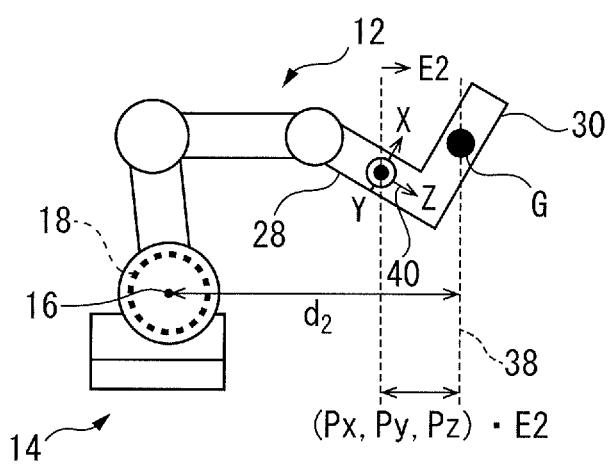
FIG. 5 exemplifies a state in which the article represents a second posture, when the position of the gravity center of the article is to be estimated.

Next, as shown in FIG. 5, robot 14 is operated so that article 30 represents a second posture different from the first posture, and then, a torque (second torque T2) applied to axis 16 is detected by torque sensor 18. At this time, with respect to second torque T2 and weight W of article 30, following equation (7) is true. In equation (2), M2 is a torque applied to axis 16 in the state of FIG. 5 (i.e., at the position and the posture of movable part 12 when second torque T2 is detected) when article 30 is not attached to robot 14, and d2 is a horizontal distance between axis 16 and vertical line 38 which passes through position of gravity center G in the state of FIG. 5.

$$T2=M2+W\times d2 \quad (7)$$

From equations (6) and (7), following equation (8) is obtained.

$$(T2-M2)-(T1-M1)=W\times(d2-d1) \quad (8)$$

In this regard, (d2−d1) can be represented following equation (9), by using: a horizontal movement distance D1 of the representative point such as a tool center point (in this case, wrist part 28 corresponding to the front end) of movable part 12; a length $(Px, Py, Pz)\cdot E1$ obtained by projecting a coordinate $(Px, Py, Pz)$ representing position of gravity center G of article 30 in the horizontal direction at the first posture; and a length $(Px, Py, Pz)\cdot E2$ obtained by projecting the coordinate $(Px, Py, Pz)$ of the gravity center G of article 30 in the horizontal direction at the second posture. In equation (9), the character "·" represents an inner product, "E1" is a unit vector of the horizontal vector in a front end coordinate system 40 defined with respect to the front end (in this case, wrist part 28) of the movable part at the first posture, and "E2" is a unit vector of the horizontal vector in front end coordinate system 40 at the second posture. The inner product and the unit vectors can be easily calculated, by using the movement command transmitted from robot controller 36 to robot 14, and the value of the encoder provided to each axis of robot 14, etc. For example, E1 is (1, 0, 0) in the example of FIG. 4, and E2 is $(1/\sqrt{2}, 0, 1/\sqrt{2})$ in the example of FIG. 5 (i.e., front end coordinate system 40 is rotated by 45 degrees about the Y-axis). In the second embodiment, the positional relationship between article 30 and front end coordinate system 40 defined for the wrist part, etc. is previously known, and the same is also applicable to the first embodiment.

$$d2-d1=D1-(Px,Py,Pz)\cdot E1+(Px,Py,Pz)\cdot E2 \quad (9)$$

From equations (8) and (9), following equation (10) is obtained.

$$(T2-M2)-(T1-M1)=W\times(D1-(Px,Py,Pz)\cdot E1+(Px,Py,Pz)\cdot E2) \quad (10)$$

Next, robot 14 is operated so that article 30 represents a third posture different from the first and second postures, and then, a torque (third torque T3) applied to axis 16 is detected by torque sensor 18. At this time, with respect to third torque T3 and weight W of article 30, following equation (11) is true. In equation (11), M3 is a torque applied to axis 16 at the position and the posture of movable part 12 when third torque T3 is detected, and when article 30 is not attached to robot 14. Further, d3 is a horizontal distance between axis 16 and the vertical line which passes through the position of gravity center of article 30, at the same position and posture of the movable part as when third torque T3 is detected.

$$T3=M3+W\times d3 \quad (11)$$

By executing the similar process as explained with respect to equations (8) to (10), following equations (12) and (13) are obtained. In other words, equation (10) is obtained by the relationship between the first and second postures, equation (12) is obtained by the relationship between the second and third postures, and equation (13) is obtained by the relationship between the third and first postures. In this regard, "E3" is a unit vector of the horizontal vector in front end coordinate system 40 defined with respect to the front end (in this case, wrist part 28) of the movable part at the third posture, and similarly to E1 and E2, the unit vector can be easily calculated, by using the movement command transmitted from robot controller 36 to robot 14, and the value of the encoder provided to each axis of robot 14, etc.

$$(T3-M3)-(T2-M2)=W\times(D2-(Px,Py,Pz)\cdot E2+(Px,Py,Pz)\cdot E3) \quad (12)$$

$$(T1-M1)-(T3-M3)=W\times(D3-(Px,Py,Pz)\cdot E3+(Px,Py,Pz)\cdot E1) \quad (13)$$

Horizontal movement distances D1 to D3 of wrist part 28 can be easily calculated, by using the movement command transmitted from robot controller 36 to robot 14, and the value of the encoder provided to each axis of robot 14, etc. Further, M1 to M3 may be obtained as the torque applied to axis 16 by using torque sensor 18, when article 30 is not attached to robot 14, after of before the first, the second torque and the third torque. Alternatively, M1 to M3 may be obtained by calculation of calculation section 32, etc., by using the mass and the position of gravity center of each component of robot 14, etc. As an example of the calculation, a Newton-Euler method may be used.

By executing the above process, three equations (10), (12) and (13) are obtained, with respect to three unknown values (Px, Py, Pz). Therefore, by solving these equations as simultaneous equations, the position of the gravity center (Px, Py, Pz) of article 30 can be calculated. In addition, by generalizing equations (10), (12) and (13), following equation (14) is obtained. In this regard, characters "i" and "j" are integers equal to or more than one, and an upper limit thereof corresponds to the number of postures of article 30 which may be represented by the motion of robot 14.

$$(Ti-Mi)-(Tj-Mj)=W\times(Di-(Px,Py,Pz)\cdot Ei+(Px,Py,Pz)\cdot Ej) \quad (14)$$

Apparent from equations (10), (12) and (13), in order to estimate the position of the gravity center G of article 30, it is sufficient to obtain T1 to T3, M1 to M3, E1 to E3, D1 to D3, and W. Therefore, when weight W of the article is known, the position (or the coordinate) of the gravity center of the article can be precisely estimated, by controlling robot 14 so as to perform the motion as described above. Constraint conditions in this embodiment are as follows: horizontal distances between D1 to D3 are not equal to zero; an equation (E1x=E2x=E3x) is false; an equation (E1y=E2y=E3y) is false; and an equation (E1z=E2z=E3z) is false. In this regard, it is assumed that E1=(E1x, E1y, E1z), E2=(E2x, E2y, E2z), and E3=(E3x, E3y, E3z).

In the second embodiment, the first torque and the second torque may be detected while robot 14 is remained at the first position, the second position and the third position. Alternatively, during movable part 12 of robot 14 is moving at a constant velocity (i.e., an angular velocity of movable part 12 is constant), torque values may be detected at three arbitrary timings (in which the posture of article 30 is different between each timing) as the first torque and the second torque. In either case, above equations (6) to (14) are true.

While the first embodiment and the second embodiment may be independently carried out, the embodiments may be sequentially carried out. In other words, first, weight W of the article may be estimated by the process explained in the first embodiment, and then, by using estimated weight W, the position of gravity center G of the article may be estimated by the process explained in the second embodiment. In this case, the second position and posture in the first embodiment (FIG. 3) may be used as the first position and posture in the second embodiment (FIG. 4). Therefore, when the two embodiments are sequentially carried out, the number of the motions of the robot may be reduced, in comparison to when the embodiments are independently carried out.

As torque sensor 18 in the first or second embodiment, any type of sensor (e.g., a non-contact (magnetostrictive) type or a contact type (slip ring) sensor) may be used, as long as the sensor can detect (measure) the torque applied to the specific axis. In the present disclosure, the "torque applied to an axis" detected by the torque sensor (i.e., a detected torque value) corresponds to a value obtained by subtracting an influence value of friction, etc., from a torque of a motor for driving each axis of the robot, or to a sum of the obtained value and an influence value of the gravity. Therefore, by using the torque sensor, the weight and/or the position of gravity center of the article can be estimated with (at least practically) a high degree of accuracy, without estimating or identifying the friction, since such estimation or identification of the friction is considered to be difficult. In this regard, it is desired that torque sensor 18 can detect the torque in the direction of the gravity, and that the movable part of the robot at the front side relative to torque sensor 18 can perform the motion for estimating the weight (in which the article is moved to the two different positions while representing the same posture), and/or the motion for estimating the position of the gravity center (in which the article represents the three different postures). For example, in the above embodiment, torque sensor 18 is configured to detect the torque applied to drive axis 16 of upper arm 24. Otherwise, when the above motion can be performed only by forearm 26 and wrist part 28, another torque sensor configured to detect a torque applied to a drive axis 42 of forearm 26 (see FIG. 1) may be used.

Alternatively, as the torque sensor, a six-axes force sensor (torque sensor) 44 (see FIG. 1), positioned inside of base part 20 or at a lower portion of base part 20 of robot 14, may be used. By using torque sensor 44, the torque applied to robot 14 can be measured, with respect to two horizontal axes perpendicular to each other. For example, when the position of the gravity center is to be estimated (in the second embodiment), two sets of (i.e., six) simultaneous equations (such as equations (10), (12) and (13)) can be obtained, with respect to the directions of the above two axes. In this case, although solutions of the two sets of simultaneous equations may be different from each other, an accuracy of the estimation can be improved by calculating an average of the solutions, etc. As such, in the present disclosure, when the number of obtained equations exceeds a minimum number of equations for calculating the unknown quantities, an amount of information for the estimation is increased. Therefore, by using an average or a least-square method, the accuracy of estimation can be improved.

When six-axes torque sensor 44 or the contact sensor (not shown) arranged on the surface of robot 14, robot 14 may have a function to detect contact between the robot and a human or peripheral equipment. The robot having such a contact-detecting function may be used as the collaborative robot which shares the working area with the human. However, when the detection accuracy of the robot is relatively low, emergency stop of the robot may frequently occur due to false detection of the robot. To the contrary, in the present disclosure, the weight and/or the position of the gravity center of the article can be precisely estimated, and thus an outer force applied to the robot can be precisely detected, by subtracting an inertia torque of the robot, a torque due to the weight of the robot, an inertia torque of the load attached to the movable part, and a torque due to the weight of the load, from a torque value detected by the torque sensor.

In the present disclosure, the storage section of the estimation device or another storage unit may store a program, by which the above process is executed by the robot or an arithmetic processing unit such as the estimation device, which is used in conjunction with the robot. Also, the program may be provided as a non-transitory computer readable medium (e.g., a CD-ROM or a USB memory) configured to store the program.

According to the present disclosure, at least one of the weight and the position of the gravity center of the article can be estimated with high accuracy, by the simple motion of the robot, during the article is attached to the robot.

While the invention has been described with reference to specific embodiments chosen for the purpose of illustration, it should be apparent that numerous modifications could be made thereto, by a person skilled in the art, without departing from the basic concept and scope of the invention.

The invention claimed is:

1. A device for estimating a position of a gravity center of an article, comprising:
    a torque sensor configured to detect a torque applied to an axis for driving a movable part of a robot; and
    a calculation section configured to calculate the position of the gravity center of the article, based on: a first torque, a second torque and a third torque applied to the axis for driving the movable part of the robot detected by the torque sensor, when the article attached to the movable part is positioned at first, second and third positions relative to the axis for driving the movable part of the robot and that are different from each other, wherein the first, second, and third positions respectively represent postures relative to gravity; a first position and a first posture of the movable part when the first torque is detected; a second position and a second posture of the movable part when the second torque is detected; and a third position and a third posture of the movable part when the third torque is detected.

2. The device as set forth in claim 1, wherein the calculation section calculates the position of the gravity center (Px, Py, Pz) of the article by using at least following three equations:

$$(T2-M2)-(T1-M1)=W\times(D1-(Px,Py,Pz)E1+(Px,Py,Pz)\cdot E2)$$

$$(T3-M3)-(T2-M2)=W\times(D2-(Px,Py,Pz)E2+(Px,Py,Pz)\cdot E3)$$

$$(T1-M1)-(T3-M3)=W\times(D3-(Px,Py,Pz)E3+(Px,Py,Pz)\cdot E1)$$

wherein T1 is the first torque; T2 is the second torque; T3 is the third torque; M1 is obtained as a torque applied to the axis when the article is not attached to the movable part and when the movable part is positioned at the first position and represents the first posture E1; M2 is obtained as a torque applied to the axis when the article is not attached to the movable part and when the movable part is positioned at the second position and represents the second posture E2; M3 is obtained as a torque applied to the axis when the article is not attached to the movable part and when the movable part is positioned at the third position and represents the third posture E3; D1 is calculated as a magnitude of a horizontal component of a vector extending from the first position to the second position, the horizontal component being perpendicular to the axis; D2 is calculated as a magnitude of a horizontal component of a vector extending from the second position to the third position, the horizontal component being perpendicular to the axis; and D3 is calculated as a magnitude of a horizontal component of a vector extending from the third position to the first position, the horizontal component being perpendicular to the axis.

3. A method for estimating a position of a gravity center of an article, comprising:
    attaching the article having a known weight to a movable part of a robot having a torque sensor;
    detecting a first torque, a second torque and a third torque applied to an axis for driving the movable part by the torque sensor, when the article attached to the movable part is positioned at first, second and third positions relative to the axis for driving the movable part of the robot and that are different from each other, wherein the first, second, and third positions respectively represent postures relative to gravity; and
    calculating the position of the gravity center of the article, based on: the detected first torque; the detected second torque; the detected third torque; a first position and a first posture of the movable part when the first torque is detected; a second position and a second posture of the movable part when the second torque is detected; and a third position and a third posture of the movable part when the third torque is detected.

4. The method as set forth in claim 3, wherein the position of the gravity center (Px, Py, Pz) of the article is calculated by using at least following three equations:

$$(T2-M2)-(T1-M1)=W\times(D1-(Px,Py,Pz)\cdot E1-F(Px,Py,Pz)\cdot E2)$$

$$(T3-M3)-(T2-M2)=W\times(D2-(Px,Py,Pz)\cdot E2+(Px,Py,Pz)\cdot E3)$$

$$(T1-M1)-(T3-M3)=W\times(D3-(Px,Py,Pz)\cdot E3+(Px,Py,Pz)\cdot E1)$$

wherein T1 is the first torque; T2 is the second torque; T3 is the third torque; M1 is obtained as a torque applied to the axis when the article is not attached to the movable part and when the movable part is positioned at the first position and represents the first posture E1; M2 is obtained as a torque applied to the axis when the article is not attached to the movable part and when the movable part is positioned at the second position and represents the second posture E2; M3 is obtained as a torque applied to the axis when the article is not attached to the movable part and when the movable part is positioned at the third position and represents the third posture E3; D1 is calculated as a magnitude of a horizontal component of a vector extending from the first position to the second position, the horizontal component being perpendicular to the axis; D2 is calculated as a magnitude of a horizontal component of a vector extending from the second position to the third position, the horizontal component being perpendicular to the axis; and D3 is calculated as a magnitude of a horizontal component of a vector extending from the third position to the first position, the horizontal component being perpendicular to the axis.

5. A non-transitory computer readable medium which stores program for causing the robot or an arithmetic processing unit used in conjunction with the robot to execute the method as set forth in claim 3.

* * * * *